(12) United States Patent
Villain et al.

(10) Patent No.: US 8,831,303 B2
(45) Date of Patent: Sep. 9, 2014

(54) DETECTION AND TRACKING OF INTERVENTIONAL TOOLS

(75) Inventors: Nicolas F. Villain, Rueil-malmaison (FR); Cécile A. M. Picard, Sèvres (FR); Nicolas P. B. Gogin, Paris (FR)

(73) Assignee: Koninklijke Philips N.V., Eindhoven (NL)

(*) Notice: Subject to any disclaimer, the term of this patent is extended or adjusted under 35 U.S.C. 154(b) by 806 days.

(21) Appl. No.: 12/679,970

(22) PCT Filed: Sep. 26, 2008

(86) PCT No.: PCT/IB2008/053936
§ 371 (c)(1),
(2), (4) Date: May 17, 2010

(87) PCT Pub. No.: WO2009/044321
PCT Pub. Date: Apr. 9, 2009

(65) Prior Publication Data
US 2010/0226537 A1    Sep. 9, 2010

(30) Foreign Application Priority Data
Oct. 1, 2007 (EP) ...................................... 07117676

(51) Int. Cl.
*G06K 9/00*      (2006.01)
*G06T 5/50*      (2006.01)
(52) U.S. Cl.
CPC ......... *G06T 5/50* (2013.01); *G06T 2207/10072* (2013.01); *G06T 2207/30101* (2013.01); *G06T 2207/30021* (2013.01); *G06T 2207/10116* (2013.01)
USPC ............ 382/128; 382/130; 382/132; 378/108
(58) Field of Classification Search
USPC ............................ 382/128, 130, 132; 378/108
See application file for complete search history.

(56) References Cited

U.S. PATENT DOCUMENTS

| 2003/0181809 | A1 | 9/2003 | Hall et al. | |
| 2005/0004454 | A1 | 1/2005 | Mitschke et al. | |
| 2006/0023840 | A1* | 2/2006 | Boese | 378/98.12 |
| 2007/0140428 | A1* | 6/2007 | Toth | 378/108 |
| 2011/0110567 | A1* | 5/2011 | Jiang | 382/128 |

FOREIGN PATENT DOCUMENTS

WO    2005004724 A1    1/2005

OTHER PUBLICATIONS

Zollei et al: "2D-3D Rigid Registration of X-Ray Fluoroscopy and CT Images Using Mutual Information and Sparsely Sampled Histogram Estimators"; Proceedings of the 2001 IEEE Conference on Computer Vision and Pattern Recognition, vol. 2, Dec. 2001, pp. 696-703.
Livyatan et al: "Gradient-Based 2-D/3-D Rigid Registration of Fluoroscopic X-Ray to CT"; IEEE Transactions on Medical Imaging, vol. 22, No. 11, Nov. 2003, pp. 1395-1406.
LaRose: "Iterative X-Ray/CT Registration Using Accelerated Volume Rendering";Carnegie Mellon University Dissertation, May 2001, 161 Page Document.

* cited by examiner

Primary Examiner — Luke Gilligan (57) ABSTRACT

The present invention relates to minimally invasive X-ray guided interventions, in particular to an image processing and rendering system and a method for improving visibility and supporting automatic detection and tracking of interventional tools that are used in electrophysiological procedures. According to the invention, this is accomplished by calculating differences between 2D projected image data of a preoperatively acquired 3D voxel volume showing a specific anatomical region of interest or a pathological abnormality (e.g. an intracranial arterial stenosis, an aneurysm of a cerebral, pulmonary or coronary artery branch, a gastric carcinoma or sarcoma, etc.) in a tissue of a patient's body and intraoperatively recorded 2D fluoroscopic images showing the aforementioned objects in the interior of said patient's body, wherein said 3D voxel volume has been generated in the scope of a computed tomography, magnet resonance imaging or 3D rotational angiography based image acquisition procedure and said 2D fluoroscopic images have been co-registered with the 2D projected image data. After registration of the projected 3D data with each of said X-ray images, comparison of the 2D projected image data with the 2D fluoroscopic images—based on the resulting difference images—allows removing common patterns and thus enhancing the visibility of interventional instruments which are inserted into a pathological tissue region, a blood vessel segment or any other region of interest in the interior of the patient's body. Automatic image processing methods to detect and track those instruments are also made easier and more robust by this invention. Once the 2D-3D registration is completed for a given view, all the changes in the system geometry of an X-ray system used for generating said fluoroscopic images can be applied to a registration matrix. Hence, use of said method as claimed is not limited to the same X-ray view during the whole procedure.

12 Claims, 2 Drawing Sheets

DETECTION AND TRACKING OF INTERVENTIONAL TOOLS

FIELD OF THE INVENTION

The present invention relates to minimally invasive X-ray guided interventions, in particular to an image processing and rendering system and a method for improving visibility and supporting automatic detection and tracking of interventional tools that are used in electrophysiological procedures. According to the invention, this is achieved by calculating differences between co-registered X-ray images and 2D projected image data of a preoperatively acquired 3D voxel volume and using these differences for enhancing the contrast and visibility of the interventional tools.

BACKGROUND OF THE INVENTION

Cardiovascular diseases (CVD), such as e.g. atherosclerosis, hypertension and ischemia, remain the leading cause of death in most developed countries as they cause permanent damage to the heart and blood vessels, which may lead to chronic heart failure, angina, or myocardial infarction (heart attack). For a patient showing symptoms of a cardiovascular disease, primary diagnosis and treatment are usually performed via interventional cardiology in a cardiac catheterization laboratory. Cardiac catheterization thereby means insertion of small tubes (catheters) through arteries and/or veins to the heart. In order to visualize coronary arteries and cardiac chambers with real-time X-ray imaging, a contrast agent is injected through the catheter. The contrast agent has to be opaque to X-rays and provide good image contrast as it flows into the coronary artery system or into the cardiac chambers. This procedure produces an image referred to as an angiogram, which is standard for diagnosing cardiovascular disease.

In the recent thirty years, X-ray guided interventional cardiology has grown considerably, fueled by demographic, technologic and economic factors. According to the American Heart Association (AHA), the number of interventional cardiology procedures grew by 470% in the United States between 1979 and 2003. New catheter-based interventional tools (such as e.g. balloon catheters and stents) allow physicians to treat more conditions and more complicated patient cases. As these new minimally invasive, image-guided procedures have positive patient outcomes and are less costly than open-heart procedures, physicians are actively encouraged by governmental and private payers to use these procedures for treating patients.

Nowadays, X-ray based cardiac catheterization systems represent the current standard of care and provide imaging modalities for both diagnostic and therapeutic procedures in cardiology. They are applied for generating real-time images of obstructions to blood flow in the coronary arteries. When an obstruction is identified, real-time X-ray imaging is utilized to guide insertion of balloon-tipped catheters to the point of obstruction for treatment by angioplasty (which means by balloon expansion of the restricted flow area in the artery) and stent placement (that is, by expanding a supporting structure to keep the newly enlarged artery open). The goal of therapy for patients with coronary artery disease is to alleviate symptoms of angina and reduce the risk of death or myocardial infarction by employing techniques and devices for re-opening the coronary arteries.

A cardiac catheterization system as mentioned above virtually enables all minimally invasive procedures in a catheterization laboratory. Currently developed systems all have the same fundamental architecture and use a point X-ray source that projects an X-ray beam through the patient and onto a large-area detector, the latter being used for converting the generated fluoroscopic image to electrical signals for display on a monitor. Thereby, a shadowgram image of the patient is obtained.

Conventionally employed cardiac catheterization systems typically perform two distinct types of real-time X-ray imaging: diagnostic angiography and interventional imaging. Diagnostic angiography is performed with a high radiation exposure in order to produce high-quality images. This diagnostic (cine) mode produces images of injected contrast agent flowing through the coronary arteries to diagnose the initial condition of the coronary arteries, determine the intervention required, and re-evaluate the coronary arteries after the intervention. Interventional imaging is performed with a regulated radiation exposure that produces lower-quality images. This interventional (fluoro) mode thereby provides real-time imaging of a patient's anatomy to guide the intervention and is used when inserting devices into the anatomy. The interventional mode is used for approximately 90% of the procedure imaging time.

While cardiovascular diseases primarily affect a patient's blood flow, cardiac electrophysiology (EP), a specific domain of interventional cardiology, involves the study of electrical abnormalities of the heart. Physicians use intra-cardiac catheters to locate and cure electrical dysfunctions of the patient's heart rhythm under X-ray fluoroscopy guidance. Congenital problems or diseased tissue in the heart can affect the electrical conduction leading to an irregular heart beat, including atrial fibrillation (AF). In this disease, the two upper chambers of the heart, the atria, do not beat efficiently, and blood is not pumped completely out of them, so it may pool and clot. If a part of the clot leaves the heart, it may cause a stroke or a pulmonary embolism. For the treatment of atrial fibrillation, certain areas of tissue may be ablated with radiofrequency energy so as to cure the anomalous electrical conduction and to permanently restore the normal heart rhythm. More precisely, the heart tissue is mapped to find the areas of abnormal electrical activity and ablated by cardiac electrophysiology to kill pathological tissue in certain areas. This procedure is commonly referred to as "mapping and zapping". The procedures to locate and ablate the appropriate areas of tissue are extremely lengthy. A patient may spend between three and six hours in the cardiac catheterization laboratory, which may include up to 90 minutes of sheer imaging time. The patient receives significant amounts of X-rays up to an equivalent of 30,000 chest X-rays, and the electrophysiologist doing the procedures usually also receives a considerable dose of scattered radiation. Electrophysiology diagnosis and treatment does not require the injection of contrast agent into the coronary arteries to produce detailed angiograms and therefore requires somewhat lower imaging capability. The long procedure times place a high value on radiation exposure reduction.

Another important EP procedure is the placement of a pacemaker for a cardiac resynchronization therapy (CRT) during which a pacemaker lead has to be placed in a coronary vein. Electrophysiologists need a special training to perfectly know the anatomy and the access pathways to all the sites of interest and some practice to select the correct devices and manipulate them to target.

The patient's anatomy can be recorded with 3D imaging devices (CT, MRI) or by injecting contrast agent locally just at the beginning of the intervention (left atrium (LA) and ostium of the pulmonary veins (PV) for atrial fibrillation and coronary veins and sinus for CRT), but the physician has to perform mental registration to navigate in the live fluoroscopy images where this information is not visible anymore.

For AF procedures, knowing the exact positions of the catheters when measuring electrical potentials is key to find the sources that cause fibrillation (ectopic foci, re-entry loop). Even more important is anatomical mapping of the ablation sites in order to perform the desired ablation patterns, such as e.g. pulmonary vein isolation or roof line ablation in the left atrium.

Today, virtually all currently available conventional X-ray based cardiac catheterization systems, such as those developed and marketed by Philips Medical, Siemens Medical, GE Medical and Toshiba Medical, use the same fundamental imaging technology, that has not changed dramatically over the past 40 years. Incremental improvements to individual component have optimized system performance over decades to close to the theoretical limits. However, current systems still exhibit significant problems with poor image quality and high radiation exposure. The key problems thereby relate to imaging, radiation hazards and operational issues.

The most difficult imaging task in the cardiac catheterization lab is imaging large patients or imaging patients at steep viewing angles. With conventional systems, a large-area detector close to the patient causes more scattered radiation reaching the detector than image radiation, severely degrading image quality. Therefore, physicians often use the high-radiation diagnostic (cine) mode during interventions to obtain better quality images.

Moreover, best image quality is only possible for a short period of time. Conventional cardiac catheterization systems can only run in the diagnostic (cine) mode for approximately 20 seconds before the X-ray tube reaches its maximum temperature and shuts down automatically. It may take several minutes before the X-ray source cools down and imaging can resume.

In addition to that, overlying anatomy may inhibit viewing and navigation. Conventional cardiac catheterization systems produce a shadowgram image that shows objects with no depth information. Discerning 3-D anatomy from these flat images is difficult. In addition, image clutter and shadowing of the heart by ribs or the spine often degrades image clarity.

Another problem conventional X-ray based cardiac catheterization systems are typically faced with is exposing both the patient and the interventionalist to excessive radiation. Conventional systems expose patients to the equivalent of 200 to 500 chest X-rays per minute in the interventional (fluoro) mode. With up to 60 minutes of imaging time during a long interventional procedure, patients can be exposed to the equivalent of 12,000 to 30,000 chest X-rays per procedure. Such a prolonged exposure can cause radiation skin burns on patients and increase the risk of cancer to the interventionalists and catheterization lab staff. Radiation exposure risk is particularly acute in certain electrophysiology procedures due to long exposures of single areas of anatomy. Preventative measures for physicians include use of heavy and cumbersome wrap-around lead aprons and vests, thyroid shields, and goggles.

Furthermore, access to patient may be obstructed by the X-ray detector. Conventional cardiac catheterization systems require that the large-area detector is positioned close to the patient, thus restricting access to the patient by the clinical staff. This design is not only claustrophobic for the patient, but is also an obstruction if cardiac pulmonary resuscitation (CPR) is required.

As briefly mentioned above, electrophysiological procedures currently guided by fluoroscopy, and particularly atrial fibrillation, often take several hours. The main task of such procedures is to place catheters or cardiovascular stents at a given location in the interior of the myocard or in a cardiac blood vessel, respectively. This is usually done under guidance of intraoperative X-ray imaging in order to visualize the position of the catheter tip. Intraoperative application of fluoroscopic X-ray imaging is often necessary to provide answers for a large number of questions. This is especially true, for instance, if a surgeon needs to visualize the morphology of blood vessels. Apart from being applied in various surgical disciplines to assist in the placement of cardiac pacemakers, surgical stents and guide wires, this imaging modality is also used in orthopedic traumatology to enable the position monitoring of medical implants, orthopedic protheses as well as surgical screws and nails. In cardiac X-ray images, on the other hand, specific high-density anatomical structures (such as e.g. the spine, specific vertebras, etc.) or foreign objects (such as e.g. pacemaker leads and surgical stitches, etc.) are most of the time visible in the X-ray image and may thus at least partly obstruct or jeopardize the visibility, detection and/or tracking of interventional tools, either because they create similar patterns or because they cast a shadow on the objects which shall be detected. Classical image subtraction techniques do not help in case of slowly moving interventional tools and would require new acquisitions of reference sequences every time the 2D view changes.

US 2003/0 181 809 A1 describes a method for visualizing a medical instrument (such as e.g. a catheter that is used during a cardiological examination or treatment) which has been introduced into an area of examination within a patient's body. The herein disclosed method can be understood as an application of a cardiac roadmapping procedure, where a 3D reconstructed angiogram is used to add vessel information to an intraoperatively generated X-ray image. To be more precisely, said method comprises the steps of using a 3D image set of the area of examination and generating a 3D reconstructed image of this area, taking at least one 2D X-ray image of the area of examination in which the instrument is visualized, registering the 3D reconstructed image relative to the 2D X-ray image, visualizing the 3D reconstructed image and superimposing the 2D X-ray image over the 3D reconstructed image on a monitor.

SUMMARY OF THE INVENTION

To overcome the problem of unwanted structures obstructing free visibility on interventional tools as used in X-ray guided interventions, a reference image, free of interventional tools and taken e.g. at the beginning of the procedure could be subtracted from an acquired X-ray sequence. Nevertheless, such a reference image is not always available since most of the time the patient already has ECG electrodes or other devices attached to or inserted into his body. Moreover, there is often a motion which may be caused by respiration, cardiac motion or movements of the patient's body during a several-hour procedure or due to rigid motion or zoom movements of a rotational angiography device's C-arm system used for generating images from the interior of said patient's body. This makes subtraction with a reference image quite difficult, if not infeasible.

It may thus be an object of the present invention to improve the visibility as well as detection and tracking of interventional tools which are applied in the scope of minimally invasive interventions under X-ray fluoroscopic guidance.

A first exemplary embodiment of the present invention is directed to a method which addresses this object by calculating differences between 2D projected image data of a preoperatively acquired 3D voxel volume showing an anatomical structure or region of interest, pathological abnormalities (such as e.g. an intracranial arterial stenosis, an aneurysm of a cerebral, pulmonary or coronary artery branch, a gastric carcinoma or sarcoma, etc.), pacemakers and/or other medical implants in a tissue of a patient's body to be examined or in a blood vessel segment of said patient's vascular system and intraoperatively recorded 2D fluoroscopic images showing the aforementioned objects in the interior of said patient's body, wherein said 2D fluoroscopic images have been co-registered with the 2D projected image data, and using the resulting difference image that is generated based on said calculation step for enhancing the contrast and visibility of interventional tools inserted into said tissue region or said blood vessel segment by removing common patterns detrimental to the visibility of the interventional tools, said patterns being contained both in the 2D projection image of the preoperatively acquired 3D voxel volume and in the intraoperatively recorded 2D fluoroscopic images.

After registration of the aforementioned 2D projected image data of said preoperatively acquired 3D voxel volume with said intraoperatively recorded 2D fluoroscopic images, the registered 2D projection image may be used to calculate a discrepancy map which can either be realized as a difference image—obtained by subtracting a representative of said 2D fluoroscopic images from the 2D projection image that has been co-registered with said 2D fluoroscopic image—or as the result of any image processing operator that may be specially designed to reduce the contrast of common patterns and enhance the contrast of those patterns which are visible only in one of the aforementioned two 2D images. Said discrepancy map can be displayed to a radiologist, which is especially useful as interventional tools, which are present in the intraoperatively recorded 2D fluoroscopic images but not in the 2D projected image data of the preoperatively acquired 3D voxel volume, are thus better visible and not hidden by other objects with high Hounsfield density values (such as e.g. bones), which supports the radiologist to detect, guide and navigate these interventional tools in the interior of said patient's body. Alternatively, said discrepancy map may be coupled to a detection filter, either to limit its region of interest or to weight its output result or simply as an input image to the filter, which is because interventional tools are better visible in the discrepancy map than in an original 2D fluoroscopic image and because the discrepancy image can be considered as a probability map for the location of an interventional tool. The output of the detection filter is typically given by a list of positional coordinates of interventional tools detected in the image which can be used to localize these tools and compute quantitative measurements.

The same method as described above may also be used to enhance visibility and detectability of blood vessel segments contained in a patient's vascular system which have been made visible in an X-ray, CT, 3DRA or MR angiogram by injection of a contrast agent. Compared with conventional digital subtraction angiography (DSA), this implies the advantage that this method is insensitive to any motions of an X-ray or 3D rotational angiography (3DRA) imaging system which is used for generating said angiogram.

According to a second exemplary embodiment, the present invention is directed to an image processing and rendering system for improving visibility and supporting automatic detection and tracking of interventional tools which are applied in the scope of minimally invasive X-ray guided interventions. Said image processing and rendering system thereby comprises a digital image processing tool that is adapted to calculate differences between 2D projected image data of a preoperatively acquired 3D voxel volume showing an anatomical structure or region of interest, pathological abnormalities, pacemakers and/or other medical implants in a tissue of a patient's body to be examined or in a blood vessel segment of said patient's vascular system and intraoperatively recorded 2D fluoroscopic images showing the aforementioned objects in the interior of said patient's body, said 2D fluoroscopic images being co-registered with the 2D projected image data, wherein said image processing and rendering system is further adapted to use the resulting difference image that is generated based on said calculation step for enhancing the contrast and visibility of interventional tools inserted into said tissue region or said blood vessel segment by removing common patterns detrimental to the visibility of the interventional tools, said patterns being contained both in the 2D projection image of the preoperatively acquired 3D voxel volume and in the intraoperatively recorded 2D fluoroscopic images.

Finally, a computer software product which is programmed for performing a method as described above when running on said image processing and rendering system is provided.

BRIEF DESCRIPTION OF THE DRAWINGS

Advantageous features, aspects, and advantages of the invention will become evident from the following description, the appended claims and the accompanying drawings. Thereby.

DETAILED DESCRIPTION OF THE INVENTION

In the following, the aforementioned image processing method and system will be explained in more detail with respect to special refinements and referring to the accompanying drawings.

Figure 1:
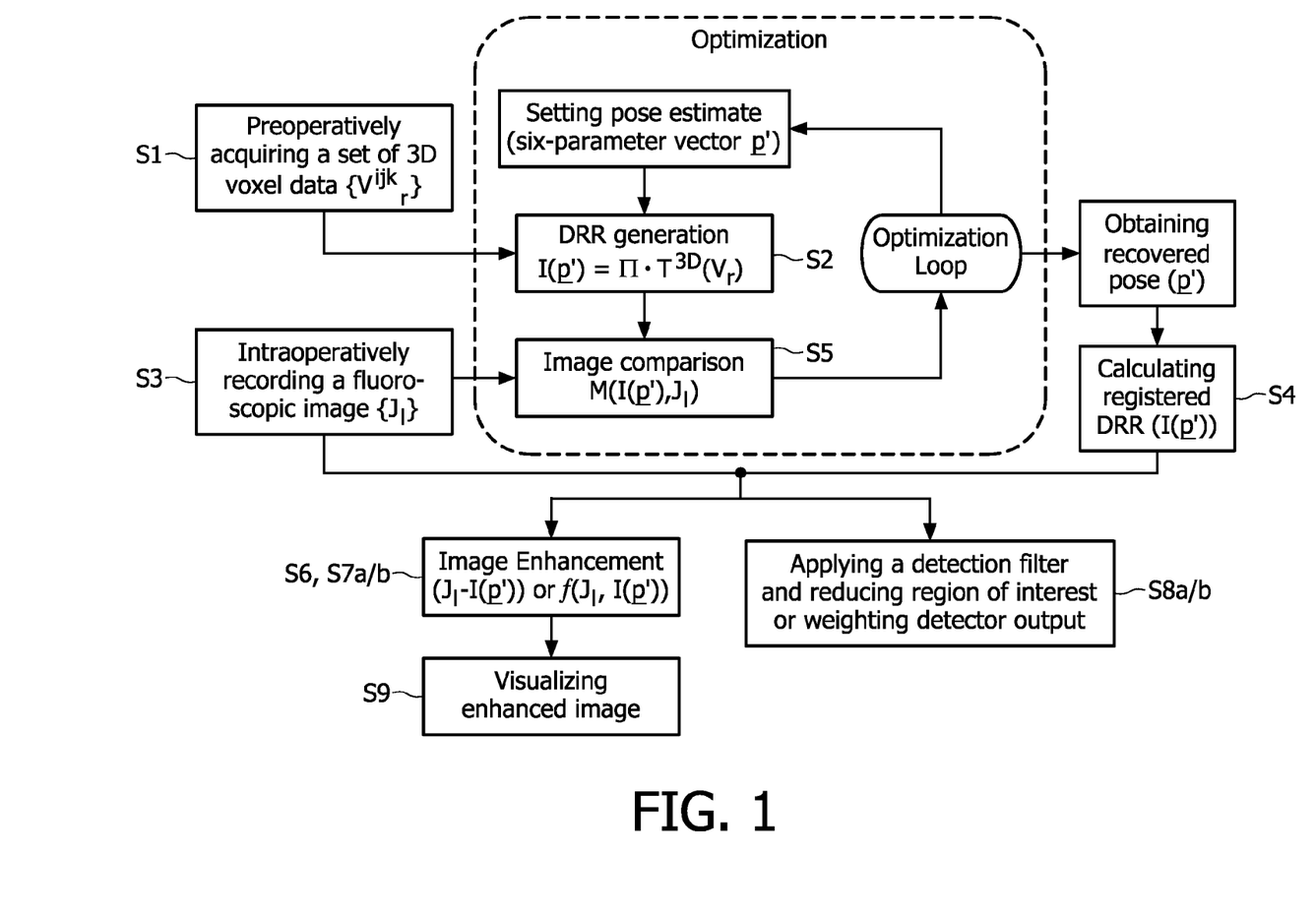
FIG. 1 shows a flowchart that illustrates the proposed image processing method according to an exemplary embodiment of the present invention.

As shown in the flowchart depicted in FIG. 1, it is proposed to use a preoperatively acquired 3D voxel data showing an anatomical structure or a pathological tissue region in the interior of a patient's body, which has e.g. been recorded (S1) with a 3D imaging device, such as e.g. a CT, MRI or rotational angiography device, etc., and register (S4) this voxel volume with acquired 2D data of intraoperatively recorded (S3) fluoroscopic X-ray images. This may be done in such a way that a digitally reconstructed radiograph (DRR), that may have been generated (S2) from the 3D voxel data by means of a ray cast algorithm which comprises the step of transforming a voxel volume into a 2D image through central projection, matches the 2D fluoroscopic images as closely as possible. To be more precisely, this registering procedure yields a 3D position that provides the best match between a DRR and the X-ray images. The quality of the match may be assessed (S5) with a metric which has to be robust to overall intensity changes as well as local mismatches due to structures that are not visible in both modalities, of course including the interventional tools.

Mathematically spoken, a digitally reconstructed radiograph (DRR) of a preoperatively acquired set of 3D voxel data that have been co-registered with an intraoperatively recorded 2D fluoroscopic image $\{J_i^{ij}\}$, said DRR being in the following equivalently denoted by $\underline{I}(p)=(I^{ij}(p))\epsilon^{N\times M}$ or $\underline{I}(p')=(I^{ij}(p'))\epsilon^{N\times M}$ (for $I^{ij}(p)$, $I^{ij}(p')\epsilon\forall(i,j)\epsilon\{(i,j)$ $\epsilon \cdot^2 | 1 \le i \le N \hat{} 1 \le j \le M\})$, respectively, can be formulated by the following equivalent composition operations as expressed by equation (1a):

$$\{I^{ij}(p')\} = (\Pi \circ T_{p'}^{3D})\{V_r^{ijk}\} \text{ with } (\Pi \circ T_{p'}^{3D}) \\ \{V_r^{ijk}\} = \Pi\{T_{p'}^{3D}\{V_r^{ijk}\}\} \quad (1a,b)$$

Therein, $\underline{V}_r := (V_r^{ijk}) \epsilon^{N \times M \times K}$ (with $V_r^{ijk} \epsilon \forall (i,j,k) \epsilon \{(i,j,k) \epsilon \cdot^3 | 1 \le i \le N \hat{} 1 \le j \le M \hat{} 1 \le k \le K\}$) denotes a set of preoperatively recorded voxel data of an acquired 3D image (with i,j and k being the respective voxel indices in x-, y- and z-direction of an Euclidian vector space $V=^3$ spanned by the orthogonal coordinate axes x, y and z of a three-dimensional coordinate system with origin O) or, equivalently, a set of image data that can be obtained by submitting the voxel data to a 3D-1D matching rule $\Phi: ^{N \times M \times K} \to$.

Transform operator $T_{p'}^{3D}\{\bullet\}$ used in above composition operation (1a) describes a rigid 3D coordinate transform $$\underbrace{\begin{bmatrix} x' \\ y' \\ z' \end{bmatrix}}_{=:x'} = \underline{R}(\Delta\varphi_x, \Delta\varphi_y, \Delta\varphi_z) \cdot \underbrace{\begin{bmatrix} x \\ y \\ z \end{bmatrix}}_{=:x} + \underbrace{\begin{bmatrix} \Delta x \\ \Delta y \\ \Delta z \end{bmatrix}}_{=:\Delta x}. \quad (2a)$$

Therein, a translational vector $\Delta x := [\Delta x, \Delta y, \Delta z]^T \epsilon^3$ is used, whose components are given by translational shift values $\Delta x$, $\Delta y$ and $\Delta z$ for describing translational offsets in $\pm x$-, $\pm y$- and/or in $\pm z$-direction, and a 3×3 rotational matrix $\underline{R}(\Delta\phi_x, \Delta\phi_y, \Delta\phi_z)$, whose components describe rotations about these coordinate axes. Thereby, said rotational matrix is defined as follows:

$$\underline{R}(\Delta\varphi_x, \Delta\varphi_y, \Delta\varphi_z) := \underline{R}(\Delta\varphi_z) \cdot \underline{R}(\Delta\varphi_y) \cdot \underline{R}(\Delta\varphi_x) \quad (2b)$$

$$= \begin{pmatrix} \cos\Delta\varphi_z & \sin\Delta\varphi_z & 0 \\ -\sin\Delta\varphi_z & \cos\Delta\varphi_z & 0 \\ 0 & 0 & 1 \end{pmatrix} \cdot$$

$$\begin{pmatrix} \cos\Delta\varphi_y & 0 & -\sin\Delta\varphi_y \\ 0 & 1 & 0 \\ \sin\Delta\varphi_y & 0 & \cos\Delta\varphi_y \end{pmatrix} \cdot$$

$$\begin{pmatrix} 1 & 0 & 0 \\ 0 & \cos\Delta\varphi_x & \sin\Delta\varphi_x \\ 0 & -\sin\Delta\varphi_x & \cos\Delta\varphi_x \end{pmatrix}.$$

Equation (2a) thus leads to a parameterization with a six-dimensional parameter vector $p' := [\Delta\phi_x, \Delta\phi_y, \Delta\phi_z, \Delta x, \Delta y, \Delta z]^T \epsilon^6$ consisting of said three translational parameters ($\Delta x$, $\Delta y$ and $\Delta z$) as well as the aforementioned three rotational parameters ($\Delta\phi_x, \Delta\phi_y$ and $\Delta\phi_z$).

Furthermore, the operator $\Pi: ^3 \to ^2$ used in equation (1a) stands for a 3D-2D projection operation $T_{p'}^{3D}\{V_r^{ijk}\} \mapsto \{I^{ij}(p')\}$ which transforms a 3D image into a 2D projection image resulting for each image pixel of the summation of the voxel intensities along a projection line. Said 2D projection operation $\Pi\{\bullet\}$ thereby relies on intrinsic parameters that are related to the image formation and the projection geometry. It can be obtained by calibration of the imaging system and may be fixed during a following optimization procedure that is needed for registration. When the X-ray system is moved (e.g. by a rotation of the C-arm or a translation of the detector, etc.), the projection operator $\Pi\{\bullet\}$ can be updated accordingly and the projection images will keep matching the X-ray images without requiring another registration step.

3D-2D rigid registration as described by transform operator $T_{p'}^{3D}\{\bullet\}$ consists in finding a rigid 3D coordinate transform $T_{p'}^{3D,opt}\{\bullet\}$ that minimizes a given 2D-2D metric (in the following referred to as M $\{\bullet,\bullet\}$) which is used to compare DRR $\{I^{ij}(p')\}$ with a 2D target image, in the following referred to as a representative $\{J_l^{ij}\}$ (for $l \in \{1, 2, \ldots, L\}$) from a set of X-ray images to be co-registered with said DRR, in our case a fluoroscopic X-ray image. The registration which yields best matching results is then given by substituting parameter vector p' in composition operation (1a) by optimized parameter vector $$p'_{opt,l} := [\Delta\hat{\varphi}_{x,l}, \Delta\hat{\varphi}_{y,l}, \Delta\hat{\varphi}_{z,l}, \Delta\hat{x}_l, \Delta\hat{y}_l, \Delta\hat{z}_l]^T \quad (3)$$
$$= \underset{\underline{p} \in IR^6}{\arg\min} \, (M\{I(\underline{p}'), \underline{J}_l\})$$

(with $l \in \{1, 2, \ldots, L\}$).

In this context, it should also be noted that metric M $\{\bullet,\bullet\}$ is given by the matching rule M: $^{N \times M} \times ^{N \times M} \to$. Besides using a metric which is calculated by means of a least mean square criterion, many different types of metrics as described in the relevant technical literature can be used for finding optimized parameter vector $p'_{opt,l}$. These metrics include similarity measures such as the Gradient Difference function $GD(I,J_l)$, the Gradient Correlation function $GC(I,J_l)$ or the Mutual Information function $MI(I,J_l)$ as defined below:

$$GD(I, J_l) := \frac{1}{2} \cdot \max_s \left[ \sum_{i,j} \frac{A_x}{A_x + \left(\frac{\partial}{\partial x}I_{ij}(x,y) - s \cdot \frac{\partial}{\partial x}J_{l,ij}(x,y)\right)^2} + \sum_{i,j} \frac{A_y}{A_y + \left(\frac{\partial}{\partial y}I_{ij}(x,y) - s \cdot \frac{\partial}{\partial y}J_{l,ij}(x,y)\right)^2} \right] \quad (4)$$

with $A_x$ and $A_y$ being two real-valued fixed constants, $$GC(I, J_k) := \quad (5a)$$
$$CC\left(\frac{\partial}{\partial x}I(x,y), \frac{\partial}{\partial x}J_l(x,y)\right) + CC\left(\frac{\partial}{\partial y}I(x,y), \frac{\partial}{\partial y}J_l(x,y)\right)$$

$$\text{with } CC(A, B) := \frac{\sum_{i,j}(A_{ij} - \overline{A}) \cdot (B_{ij} - \overline{B})}{\sqrt{\sum_{i,j}(A_{ij} - \overline{A})^2 \cdot \sum_{i,j}(B_{ij} - \overline{B})^2}}, \quad (5b)$$

and $$MI(I, J_k) := \sum_{m \in I} \sum_{n \in J_l} p(m,n) \cdot \log_{10}\left(\frac{p(m,n)}{p(m) \cdot p(n)}\right), \quad (6)$$

wherein p(m, n) denotes the joint probability density function of two given pixels m and n from $\{I^{ij}(p')\}$ and $\{J_l^{ij}\}$, respectively, and p(m) and p(n) respectively denote the marginal probability density functions of said two pixels m and n.

In practice, this problem can be solved by using an appropriate optimization loop, such as given by a gradient descent algorithm or by Powell's multi-dimensional direction set method.

In this context, it should also be pointed out that once said optimal registration parameters $\Delta\hat{\phi}_{x,l}, \Delta\hat{\phi}_{y,l}, \Delta\hat{\phi}_{z,l}, \Delta\hat{x}_l, \Delta\hat{y}_l$ and $\Delta\hat{z}_l$ are found, they are assumed as being fix and thus do not need to be re-computed each time the X-ray imaging system is moved. However, if the patient moves on the patient table, 2D-2D metric M {•,•} will reflect a change and can therefore be used to detect this motion and trigger a re-computation of 3D coordinate transform $T_p^{3D}\{\bullet\}$.

After having executed a registration procedure as described above, mismatches between the DRR and the 2D fluoroscopic images are indicators of objects which are present during an intervention but not in a preoperative scan, such as e.g. interventional tools. A map of such discrepancies can be used directly or in conjunction with a detection filter so as to enhance visibility of the interventional tools and support their automatic detection (and tracking). This approach is intrinsically robust to changes in the X-ray system geometry (rotation, changes in patient-to-detector distance, etc.).

According to the invention, said registration can be adjusted at any stage to compensate for motions of the patient or of the applied X-ray imaging system, which may e.g. be done automatically by adapting the registration parameters to the X-ray system geometry in real-time.

As the presence of high-density objects such as e.g. the spine in an intraoperatively generated 2D fluoroscopic image may have an influence on the number of detected catheters as the spine creates similar patterns, it can be cleared after registration of the preoperatively calculated DRR with the 2D fluoroscopic image, which thus enhances detectability of said catheters.

Once the voxel volume is registered with the 2D fluoroscopic image, mismatching regions can be used for guiding the detection of interventional tools. For instance, a difference image calculated by subtracting (S6) the DRR image data as obtained from the acquired image data of the 2D fluoroscopic image may be generated, where the common patterns of the two images are removed or softened (S7a), whereas those which are visible only in one of them are enhanced (S7b). Beside anatomical structures, such as e.g. the spine, other objects may be present in the patient's body beforehand (e.g. a previously implanted pacemaker, surgical stitches, etc.). Owing to their high density, they are highly visible in the 2D fluoroscopic images. However, they may not be relevant for the current intervention and can even at least partly obstruct or jeopardize the visibility of electrophysiological catheters or other interventional tools. Since those foreign objects are present in the preoperatively acquired 3D voxel data, they will be also present in the DRR generated from this registered volume and will disappear in the difference image.

In the obtained difference image, visibility of interventional tools is enhanced. Furthermore, their automatic detection and tracking can be improved in several ways:

Said difference image can directly be used as a detection filter, which is due to the fact that localized mismatches between preoperatively and intraoperatively recorded images with high attenuation are very specific to interventional tools as explained before.

If another detection filter is available, said difference image can also be used to reduce (S8a) the region of interest to which the detection filter is applied or to weight (S8b) the output of this detection filter according to the fact that mismatching regions are more likely to contain interventional tools.

Finally, a contrast-enhanced fused version of the DRR image and the 2D fluoroscopic image can be visualized on a monitor screen (S9).

Figure 2:
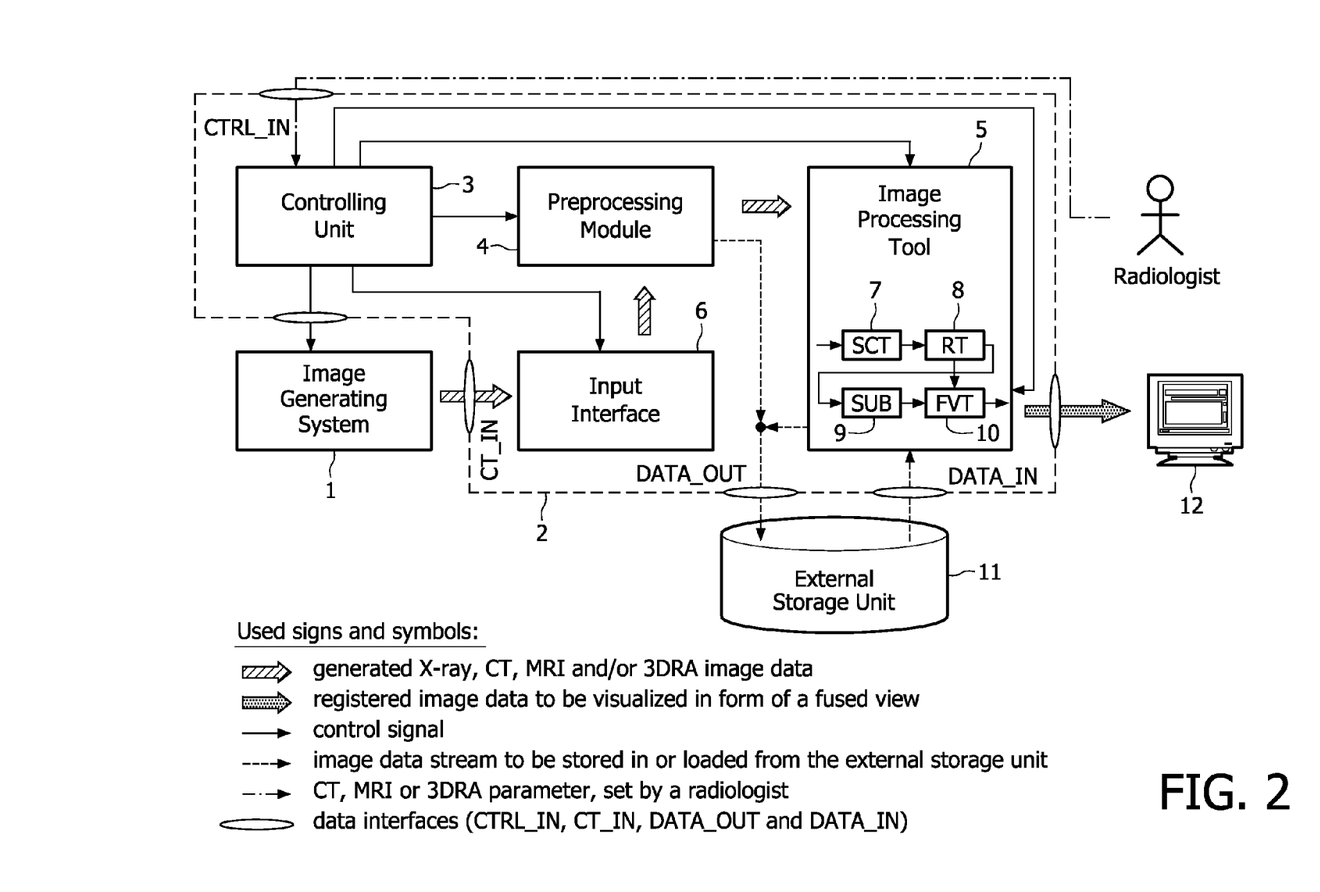
FIG. 2 shows a schematic block diagram of an image processing and rendering system according to a further schematic exemplary embodiment of the invention.

FIG. 2 depicts a schematic block diagram of an image processing and rendering system 2 according to an exemplary embodiment of the present invention which makes it possible to store, process and visualize medical image data showing an anatomical structure or a specific region of interest, pathological abnormalities, interventional tools, pacemakers and/or other medical implants in a tissue of a patient's body to be examined or in a blood vessel segment of said patient's vascular system on the monitor screen of an angiography workstation 12 connected to said image processing and rendering system 2. The image data may e.g. be given in the form of intraoperatively acquired 2D fluoroscopic images, volume-rendered image data or preoperatively recorded 3D voxel data which are generated and provided by an image generating system 1, such as e.g. by a conventional computed tomography (CT), magnet resonance imaging (MRI) or 3D rotational angiography (3DRA) device. The acquired 2D and 3D image data can either be visualized in different windows or in a common window showing a fused view of a DRR that has been generated from the preoperatively recorded 3D voxel data and an intraoperatively acquired 2D fluoroscopic image which has been co-registered with said DRR. As shown in FIG. 2, image data generated by said image generating system 1 is fed to the image processing and rendering system 2 via an input interface 6. Aside from a controlling unit 3 which controls the data exchange with the image generating system 1, said image processing and rendering system 2 may comprise a preprocessing module 4 which may particularly be equipped with a digital filter for noise reduction and contrast enhancement. An image processing tool 5, integrated in said image processing and rendering system, may serve for generating volume-rendered 3D views, surface-shaded display (SSD) images, multiplanar reformatted images and/or digitally reconstructed radiographs (DRRs) that are rendered based on the generated 3D voxel data of a given anatomical object, pathological structure, interventional tool or medical implant in a patient's tissue region of interest to be visualized.

As exemplarily depicted in the block diagram shown in FIG. 2, said image processing tool 5 may be equipped with a segmentation and clustering tool 7 for determining the contours of anatomical objects, pathological structures, interventional tools and medical implants as well as with a registration tool 8 for determining the parameters of a 2D-3D registration mapping used for registering the DRR with a 2D fluoroscopic image. For calculating the difference image mentioned above, a digital subtraction tool 9 may be applied. A fusing and visualization tool 10, which may also be integrated in said image processing tool 5, may serve for generating and visualizing a fused image of the DRR and the 2D fluoroscopic image after being submitted to said 2D-3D registration.

As shown in FIG. 2, image data that have been generated by the image generating system 1 and supplied to the image processing system 2 via said input interface 6 may temporarily or persistently be stored in an image data archive of an external storage unit 11 via data output interface DATA_OUT. For being visualized, the stored image data can be loaded via a data input interface, in FIG. 2 referred to as "DATA_IN", into a local temporary storage of image processing and rendering system 2 (not shown), thereby using a standardized data format (such as e.g. the DICOM format).

Applications of the Invention

The present invention can be used in any situation where it is beneficial to improve detection and tracking of interventional tools in interventional X-ray imaging. It can be applied in X-ray systems, medical workstations and consoles, in particular in clinical equipments that are dedicated to electrophysiology procedures.

While the present invention has been illustrated and described in detail in the drawings and in the foregoing description, such illustration and description are to be considered illustrative or exemplary and not restrictive, which means that the invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage. A computer program may be stored/distributed on a suitable medium, such as e.g. an optical storage medium or a solid-state medium supplied together with or as part of other hardware, but may also be distributed in other forms, such as e.g. via the Internet or other wired or wireless telecommunication systems. Any reference signs in the claims should not be construed as limiting the scope of the invention.

The invention claimed is:

1. A method for improving visibility and supporting automatic detection and tracking of interventional tools which are to be applied in the scope of minimally invasive X-ray guided interventions, said method comprising the steps of a processor calculating (S6) discrepancy maps graphically illustrating differences between 2D projected image data of a preoperatively acquired 3D voxel volume showing one or more of an anatomical structure or region of interest, pathological abnormalities, pacemakers and other medical implants in a tissue of a patient's body to be examined or in a blood vessel segment of said patient's vascular system and intraoperatively recorded 2D fluoroscopic images showing the one or more of an anatomical structure or region of interest, pathological abnormalities, pacemakers and other medical implants as well as interventional tools which have been introduced into the interior of said patient's body, wherein said 2D fluoroscopic images have been co-registered (S4) with the 2D projected image data, and the processor providing the discrepancy maps as an input to a detection filter to automatically reduce (S8a) a region to which the detection filter is applied; the detection filter using the discrepancy maps as probability maps for the location of the interventional tools by weighing mismatching regions of the discrepany maps as more likely to contain interventional tools.

2. A method according to claim 1, wherein once the 2D projected image data of a preoperatively acquired 3D voxel volume is registered with the 2D fluoroscopic image, all mismatching regions are used for guiding the detection of interventional tools by providing a difference image, calculated by subtracting (S6) a representative of the intraoperatively recorded 2D fluoroscopic images from that 2D projection image of the preoperatively acquired 3D voxel volume to which the representative 2D fluoroscopic image is co-registered.

3. A method according to claim 1, wherein said discrepancy maps are calculated as a result of an image processing operator adapted to reduce the contrast of common patterns and to enhance the contrast of those patterns which are visible either in a representative of the intraoperatively recorded 2D fluoroscopic images or in that 2D projection image of the preoperatively acquired 3D voxel volume to which the representative 2D fluoroscopic image is co-registered.

4. A method according to claim 1, wherein said registration is automatically adjusted at any stage to compensate for one or more of motions of the patient and changes in the system geometry of an X-ray imaging system that is used for intraoperatively recording said 2D fluoroscopic images, wherein said adjustment is done by adapting the registration parameters to the current position of the patient and/or to the changed X-ray system geometry in real-time.

5. A method according to claim 1, wherein said 2D projected image data is obtained by submitting the preoperatively acquired 3D voxel volume to an image rendering algorithm for generating a digitally reconstructed radiograph from an inputted 3D image data sequence.

6. A method according to claim 5, wherein said 3D image data sequence is generated by means of a computed tomography, magnet resonance imaging or 3D rotational angiography based image acquisition procedure.

7. An image processing and rendering system (2) for improving visibility and supporting automatic detection and tracking of interventional tools which are to be applied in the scope of minimally invasive X-ray guided interventions, said image processing and rendering system (2) comprising a processor executing a program of instructions to create a digital image processing tool (5) that is adapted to calculate discrepancy maps graphically illustrating differences between 2D projected image data of a preoperatively acquired 3D voxel volume showing at least one of an anatomical structure or region of interest, pathological abnormalities, pacemakers and other medical implants in a tissue of a patient's body to be examined or in a blood vessel segment of said patient's vascular system and intraoperatively recorded 2D fluoroscopic images showing the at least one of an anatomical structure or region of interest, pathological abnormalities, pacemakers and other medical implants as well as interventional tools which have been introduced into the interior of said patient's body, said 2D fluoroscopic images being co-registered with the 2D projected image data, wherein said image processing tool (5) is further adapted to provide the discrepancy maps as an input to a detection filter to automatically reduce a region to which the detection filter is applied;

the detection filter using the discrepancy maps as probability maps for the location of the interventional tools by weighing mismatching regions of the discrepancy maps as more likely to contain interventional tools.

8. An image processing and rendering system according to claim 7, wherein said image processing tool (5) is adapted to calculate each discrepancy map by subtracting a representative of the intraoperatively recorded 2D fluoroscopic images from that 2D projection image of the preoperatively acquired 3D voxel volume to which the representative 2D fluoroscopic image is co-registered.

9. An image processing and rendering system according to claim 7, wherein said image processing tool (5) is adapted to calculate each discrepancy map as a result of an image processing operator adapted to reduce the contrast of common patterns and to enhance the contrast of those patterns which are visible either in a representative of the intraoperatively recorded 2D fluoroscopic images or in that 2D projection image of the preoperatively acquired 3D voxel volume to which the representative 2D fluoroscopic image is co-registered.

10. An image processing and rendering system according to claim 7, wherein the processor further executes a program of instructions to create a registration parameter adjustment tool for automatically adjusting said registration at any stage to compensate for motions of the patient and/or changes in the system geometry of an X-ray imaging system that is used for intraoperatively recording said 2D fluoroscopic images, wherein said registration parameter adjustment tool is adapted to perform said adjustment by adapting the registration parameters to the current position of the patient and/or to the changed X-ray system geometry in real-time.

11. A computer software product comprising a computer readable storage device having encoded thereon a program of instruction for performing a method for improving visibility and supporting automatic detection and tracking of interventional tools which are to be applied in the scope of minimally invasive X-ray guided interventions when running on an image processing and rendering system (2), said method comprising the steps of calculating (S6) discrepancy maps graphically illustrating differences between 2D projected image data of a preoperatively acquired 3D voxel volume showing one or more of an anatomical structure or region of interest, pathological abnormalities, pacemakers and other medical implants in a tissue of a patient's body to be examined or in a blood vessel segment of said patient's vascular system and intraoperatively recorded 2D fluoroscopic images showing the one or more of an anatomical structure or region of interest, pathological abnormalities, pacemakers and other medical implants as well as interventional tools which have been introduced into the interior of said patient's body, wherein said 2D fluoroscopic images have been co-registered (S4) with the 2D projected image data, and providing the discrepancy maps as an input to a detection filter to automatically reduce (S8a) a region to which the detection filter is applied; the detection filter using the discrepancy maps as probability maps for the location of the interventional tools by weighing mismatching regions of the discrepancy maps as more likely to contain interventional tools.

12. A computer software product according to claim 11, wherein, once the 2D projected image data of a preoperatively acquired 3D voxel volume is registered with the 2D fluoroscopic image, all mismatching regions can be used for guiding the detection of interventional tools by providing a difference image, calculated by subtracting (S6) the 2D projection image data from the acquired image data of the 2D fluoroscopic image, wherein the contrast of common patterns in the two images is reduced (S7a), while the contrast of those patterns which are visible only in one of these images is enhanced (S7b).

* * * * *